Oct. 31, 1967  E. B. WAGNER  3,349,863
OSCILLATING AXLE SUSPENSION
Filed June 27, 1966

INVENTOR.
EDDIE B. WAGNER
BY
*Leo R. Schermerhorn*
Attorney

| United States Patent Office | 3,349,863 |
|---|---|
| | Patented Oct. 31, 1967 |

3,349,863
OSCILLATING AXLE SUSPENSION
Eddie B. Wagner, Portland, Oreg., assignor to Wagner Mining Scoop, Inc., Portland, Oreg., a corporation of Oregon
Filed June 27, 1966, Ser. No. 560,738
8 Claims. (Cl. 180—22)

ABSTRACT OF THE DISCLOSURE

A tractor shovel is disclosed having two dual axle bogies, one bogie having an improved oscillating axle suspension with greater flexibility, all eight wheels being driven.

This invention relates to improvements in an oscillating axle suspension for vehicles and has particular reference to a tandem axle bogie.

Objects of the invention are to provide an improved oscillating axle suspension, to provide an improved oscillating axle suspension embodied in a tandem axle bogie and to provide a suspension of the type described in which the tandem axles are driving axles.

In the present construction, the bogie is mounted for oscillation as a unit about the longitudinal axis of the vehicle. The ends of the two axles are mounted on the ends of longitudinal walking beams on opposite sides of the vehicle. The walking beams in turn are mounted for rocking movements in the bogie structure, making the suspension flexible for travel over uneven ground. The suspension includes novel driving means for both axles.

Still other objects and advantages will become apparent and the invention will be better understood from the following description of the preferred embodiment illustrated in the accompanying drawing. Various changes may be made, however, in the details of construction and arrangement of parts and certain features may be used without others. All such modifications within the scope of the appended claims are included in the invention.

Figure 1:
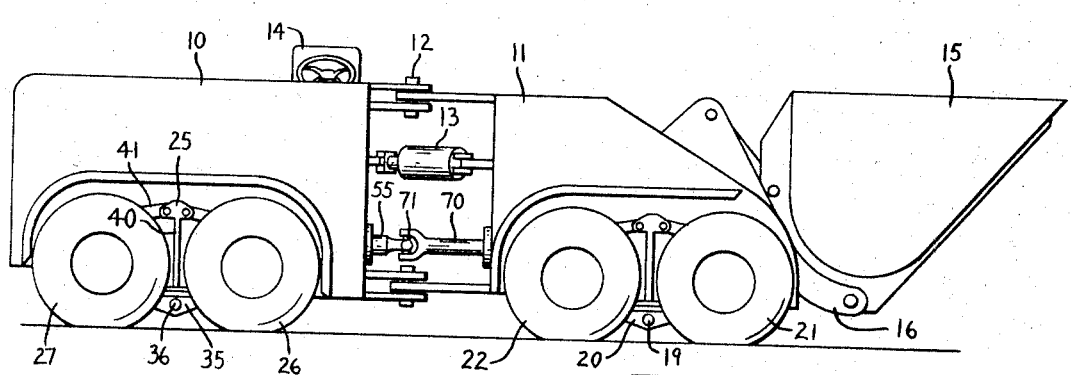
FIGURE 1 is a side elevation view of a vehicle embodying the principles of the invention.
Figure 3:
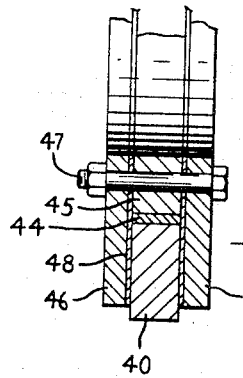
FIGURE 3 is an enlarged view on the line 3—3 in FIGURE 2.

By way of example, the invention is illustrated in connection with a loader vehicle having two body sections 10 and 11 pivotally connected together on a vertical axis at 12 for steering. Steering is accomplished by a pair of angularly related hydraulic cylinders 13 pivotally connected between the two body sections as will be understood by persons skilled in the art.

Body section 10 carries the engine and a driver's seat 14 and body section 11 carries a loader bucket 15 mounted on a boom 16 for movement to digging, carrying and dumping positions. The vehicle travels with equal facility in opposite directions so the direction of movement in digging will be considered as forward travel whereby body section 10 will be referred to as the rear body section and section 11 will be referred to as the front body section. The invention is not limited to this particular type of vehicle but is applicable to various other types as well.

Front body section 11 is supported on a conventional walking beam suspension 20 having dual axles carrying front wheels 21 and rear wheels 22 on opposite sides of the vehicle. The walking beam suspension 20 allows one or both front wheels 21 to move up or down relative to rear wheels 22 but does not allow both wheels 21 and 22 on the same side of the vehicle to move up or down relative to the vehicle at the same time. The walking beam 20 on each side of the vehicle is mounted for rocking movements on a transverse trunnion tube 19 which is rigidly connected with body section 11 and the dual axles are mounted on the ends of the walking beams. This type of front suspension provides stability for body section 11 so that bucket 15 can carry a heavy load in raised position without tilting body section 11 to one side or the other. Body section 11 cannot tilt relative to its wheels and the vetrical axis pivotal connection at 12 between body sections 10 and 11 prevents one body section from tilting relative to the other whereby body section 10 is stabilized by body section 11.

Provision must be made, however, for relative tilting in some part of the suspension system in order to provide the necessary flexibility for travel over an uneven ground surface. Such flexibility is provided by the duel axle bogie 25 which supports rear body section 10. The bogie 25 is equipped with front and rear wheels 26 and 27 on opposite sides of the vehicle. The bogie may oscillate as a unit relative to body section 10 about a longitudinal axis while longitudinal walking beams on opposite sides of the bogie permit the front and rear wheels 26 and 27 to move up and down relative to each other. This allows each of the eight wheels of the vehicle to support its share of the load on an uneven surface and maintain normal traction.

The front and rear wheels 26 and 27 are mounted on tubular axle housings 30 and 31. These axle housings are equipped at their opposite ends with underhung brackets 32 having bearings 33 pivotally mounted on pins 34 for connection with the opposite ends of a pair of longitudinal walking beams 35. The walking beams are journalled for rotation in bearings 33 and the bearings may pivot on pins 34, so that one wheel may move up and down relative to the other three.

Figure 2:
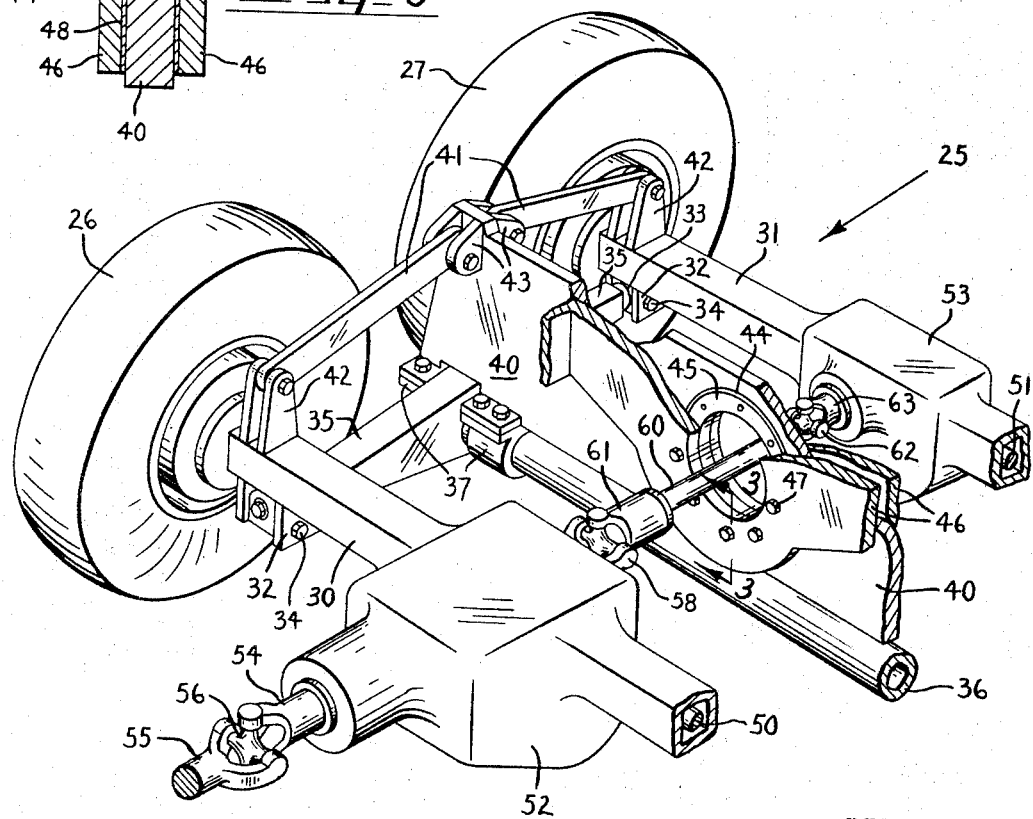
FIGURE 2 is a fragmentary enlarged perspective view of the bogie in FIGURE 1, looking from the opposite side of the vehicle.

There is a walking beam 35 on each side of the bogie as shown on the one side in FIGURE 2, which shows the opposite side from that appearing in FIGURE 1. The two walking beams 35 are mounted at their centers for rocking movements on the opposite ends of a transverse trunnion tube 36. The ends of trunnion tube 36 are supported on opposite sides of each walking beam by a pair of underhung brackets 37 on the lower edge of a vertically disposed transverse bogie beam 40.

Brake torque reaction on the axle housings is opposed by a pair of torque links 41 above each walking beam. The remote ends of these links are pivotally connected to upstanding axle housing brackets 42 and the adjacent ends are pivotally connected to a pair of brackets 43 on the upper edge of bogie beam 40. Each link 41 forms, with its associated walking beam 35 and connected parts, a parallelogram linkage to hold its axle housing against rotation as the end of the walking beam moves up and down.

Bogie beam 40 is mounted for oscillation on a cylindrical bushing 44 on an annulus 45 connected with the frame of body section 10. This connection is effected by a pair of vertically disposed transverse frame plates 46 of the body section 10 which are secured by bolts 47 to opposite end faces of annulus 45. Bogie beam 40 oscillates in the space between the frame plates 46. Plates 46 are faced with a suitable bearing material 48.

In traversing uneven ground, the whole bogie 25 may oscillate as a unit about the longitudinal axis of annulus 45 while the walking beams 35 may rock about the transverse axis of trunnion tube 36. The attitude of frame members 46 is controlled by front body section 11, acting through pivotal steering connection 12 as previously described.

Axle housings 30 and 31 contain driving axles 50 and 51, or axle halves, connected with the four wheels 26 and 27. The two axle halves 50 are driven through a differential indicated generally at 52 and the two axle halves 51 are driven through a differential indicated generally at 53. Differential 52 has an input shaft 54 which is connected to the rear end of a main drive shaft 55 through a universal joint 56. Shaft 54 extends through the differential 52 and its opposite end is connected through a universal joint 58 with an intermediate shaft 60. This connection includes a splined slip joint 61 to permit shaft 60 to move longitudinally relative to differential 52. The rear end of shaft 60 is connected through a universal joint 62 with the input shaft 63 of differential 53. Shaft 60 passes through the open center of annulus 45 on the axis of the annulus.

Front section wheels 21 and 22 are driven by conventional means from a shaft 70. Shaft 70 is connected to the front end of shaft 55, or other drive shaft provided, through a universal joint 71 located on the pivotal steering axis 12. Thus, all eight wheels are driven wheels.

Having now described my invention and in what manner the same may be used, what I claim as new and desire to protect by Letters Patent is:

1. A bogie for a vehicle comprising a transverse beam, bearing means in the center of said beam for mounting the beam for oscillation about an axis extending longitudinally of the vehicle, a pair of longitudinal walking beams mounted for independent rocking movements on opposite ends of said transverse beam, a pair of longitudinally spaced, transversely extending axle housings having wheels and brackets at their ends, and a longitudinal bearing pivotally mounted on each bracket for rotation on a transverse axis, the opposite ends of said walking beams being journalled in said pivotal bearings about longitudinally extending axes.

2. A bogie as defined in claim 1, including a trunnion tube extending along the lower edge of said transverse beam and connected therewith, said walking beams being pivotally mounted on the opposite ends of said tube.

3. A bogie as defined in claim 2, said brackets being underhung on said axle housings, upstanding brackets on said axle housings above said underhung brackets, and longitudinal torque links pivotally connected between said upstanding brackets and the upper edge of said transverse beam.

4. The combination of claim 1, including drive means for all four wheels.

5. The combination of claim 4, said vehicle being a shovel loader having a bucket which is loaded by the thrust exerted by said wheels.

6. A bogie for a vehicle comprising a transverse beam, bearing means in the center of said beam for mounting the beam for oscillation about an axis extending longitudinally of the vehicle, a pair of longitudinal walking beams mounted for rocking movements on opposite ends of said transverse beam, a pair of axle housings flexibly mounted at their ends on the ends of said walking beams, said bearing means having an open center, driving axles in said axle housings, and a longitudinal drive shaft for one of said axles extending through said open center of said bearing means.

7. A bogie as defined in claim 6, including a differential in each of said axle housings, said drive shaft interconnecting said differentials, and a main drive shaft connected with one of said differentials.

8. A bogie for a vehicle comprising a transverse beam, bearing means in the center of said beam for mounting the beam for oscillation about an axis extending longitudinally of the vehicle, a pair of longitudinal walking beams mounted for rocking movements on opposite ends of said transverse beam, a pair of axle housings flexibly mounted at their ends on the ends of said walking beams, said bearing means having an open center, said bearing means comprising an annulus and said vehicle having a pair of transverse frame members secured to opposite faces of said annulus, said transverse beam being rotatable on said annulus between said pair of frame members.

References Cited

UNITED STATES PATENTS

| | | | |
|---|---|---|---|
| 1,772,733 | 8/1930 | Romine | 180—22 |
| 2,219,533 | 10/1940 | Ross. | |
| 2,480,211 | 8/1949 | Avila | 280—104.5 |
| 3,007,590 | 11/1961 | Mathew et al. | 180—51 X |

FOREIGN PATENTS

| | | |
|---|---|---|
| 729,859 | 5/1932 | France. |
| 537,619 | 6/1941 | Great Britain. |

A. HARRY LEVY, *Primary Examiner.*